United States Patent [19]

Pickens et al.

[11] 3,867,588

[45] Feb. 18, 1975

[54] QUICK DISCONNECT FOR TELECOMMUNICATION LINES

[75] Inventors: Herman Leon Pickens; Thomas P. Miller, both of Jackson, Tenn.

[73] Assignee: Terra Corporation, Jackson, Tenn.

[22] Filed: June 1, 1973

[21] Appl. No.: 365,831

[52] U.S. Cl. .......... 179/175.3 R

[51] Int. Cl. .......... H04b 3/46

[58] Field of Search .......... 179/175.31 R, 81 R, 2 A; 340/172

[56] References Cited

UNITED STATES PATENTS

| | | | |
|---|---|---|---|
| 2,979,551 | 4/1961 | Pack | 320/61 |
| 3,636,280 | 1/1972 | Wetzel | 179/175.3 R |
| 3,725,613 | 4/1973 | Allen et al. | 179/175.3 R |
| 3,739,107 | 6/1973 | Spencer | 179/175.3 R |
| 3,766,336 | 10/1973 | Wikholm | 179/175.3 R |
| 3,773,986 | 11/1973 | Tremblay | 179/175.3 R |

*Primary Examiner*—William C. Cooper
*Assistant Examiner*—Douglas W. Olms
*Attorney, Agent, or Firm*—Alter, Weiss, Whitesel & Laff

[57] ABSTRACT

A remote disconnect device installed on a telephone subscriber's premises can be activated for a period of time approximately equal to that of a line testing action to be undertaken at a central office test desk. When the device is activated, the line is disconnected from equipment on the premises for a controlled period of time, and then it automatically reconnects itself to that equipment. This device allows necessary or desirable line tests (which are well known to those skilled in the art) to be made by the operating telephone company personnel while the line is free of both line potential and attachments.

17 Claims, 4 Drawing Figures

QUICK DISCONNECT FOR TELECOMMUNICATION LINES

Figure 1:
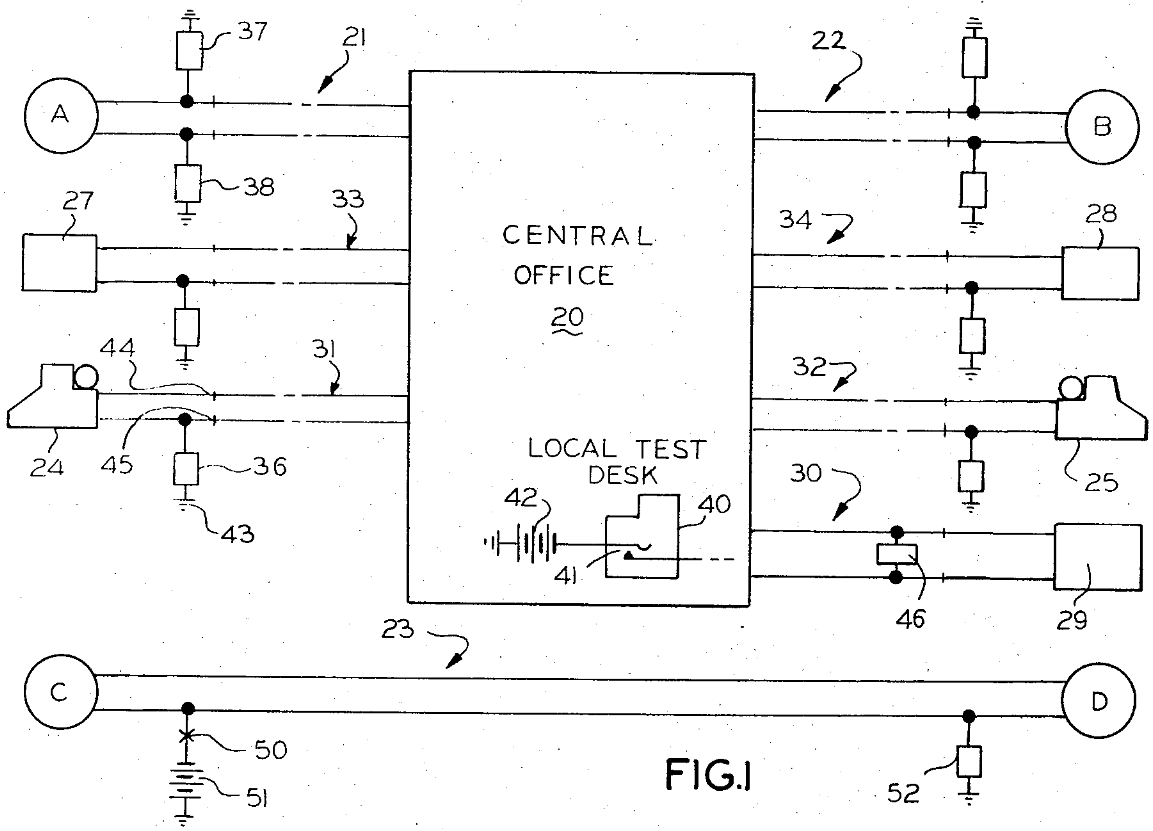

This invention relates to remote control supervision over attachments on telephone lines by disconnecting them therefrom responsive to control signals transmitted from a central office, and more particularly to means for enabling the disconnection of not only such attachments, but also the sources of line potentials, while testing the line.

In the telephone industry there are a number of situations where telephone lines are leased by operating telephone company. The equipment (sometimes called "foreign equipment") which is connected to the subscriber ends of these leased lines may be the personal property of the leasee of the line, who may be either the telephone company's customer or another company which is providing services on the leasee's premises. Exemplary of this type of foreign equipment are teleprinters, burglar alarms, music and program channels, and a wide variety of other control and metering equipment.

Within the administration of the operating telephone companies, the foreign equipment creates a problem with regard to the service and operating maintenance of the line proper. The operating company must maintain the line up to the subscriber's presmises, or any other connecting point for the foreign equipment. There the operating telephone company's responsibility ceases, and the owner of the foreign equipment becomes responsible. Hence, there should be some means whereby the operating telephone company may test its line and associated equipment and exclude the foreign equipment attached thereto. Of course, the telephone operating company may also use the same exclusion principles to identify and isolate its own faulty equipment.

Basically, the lines which are leased by the operating telephone company fall into two categories. First, a pair of wires, or a multiplicity of wires are connected between geographically separated points. All of the equipment at both ends of these wires is furnished by the customer or by a contracting company acting on behalf of the end customer. The operating telephone company does not provide any switching or any other function. The operating company is only responsible for the maintenance for the wires used as a communication channel. Second, the operating telephone company not only leases lines, but also supplies those types of telephone services which utilize the basic exchange. Exemplary of this is the type of lease situation, the customer uses his own telephone or PABX, and leases only the dial line and central office switching services from the operating telephone company. Here the operating company must both maintain the line and insure the reliability of the central office switching system.

In all cases there is some point of demarcation between where the responsibility of the operating telephone company stops and the responsibility of the connecting company or customer begins. Thus, for maintenance purposes, the operating telephone company personnel has a problem of isolating and separating the troubles appearing on the line according to the responsibility of ownership.

As a standard maintenance procedure, the operating telephone company usually sends a testman to the subscriber's premises or the final point of connection.

There, the telephone company's equipment is physically and manually disconnected. Then the telephone company personnel makes the necessary tests on the line to determine where the fault is located. If necessary, the subscriber or connecting customer is told that his equipment is deficient or not functioning properly. Otherwise, the operating telephone company must perform the appropriate maintenance.

Accordingly, an object of this invention is to provide means for and a method whereby an operating telephone company is able to remotely operate a line disconnect unit from a centrally located dispatch point. In particular, an object is to disconnect the line at the remote point where the operating telephone company's responsibility ends. Here, an object is to achieve this disconnect for a selectable period of time which is sufficient to allow line testing. In this connection, an object is to test the operating company's line while it is free of all attachments including, where appropriate, all sources of line potential.

More particularly, an object of the invention is to test the exchange plant, equipments, and cables free of foreign attachments thereto. Here, an object is to determine whether the trouble is the operating telephone company's equipment or the customer's equipment. Yet another object is to avoid interference with a special dedicated type of equipment such as teletypewriters, burglar alarms, or music channels.

In keeping with an aspect of the invention, these and other objects are accomplished without interfering with the normal operation of the telephone company's equipment, as by manually disconnecting the line for extended periods of time. When the local test man desires, a remote controlled disconnect device is preliminarily activated for a period of time which is approximately equal to the time required for testing action to be taken at the test desk. The remote unit remains operated and holds the line disconnected for a similar period of time, and then automatically reconnects the line. In other words, if a key is held operated for a selected period of time, a battery charges that long. The remote unit is then energized by the battery, and the line is disconnected over the period while the battery discharges. This allows all of the necessary line tests (which are well known to those skilled in the art) to be made by the operating telephone company personnel.

Figures 2, 3, 4:
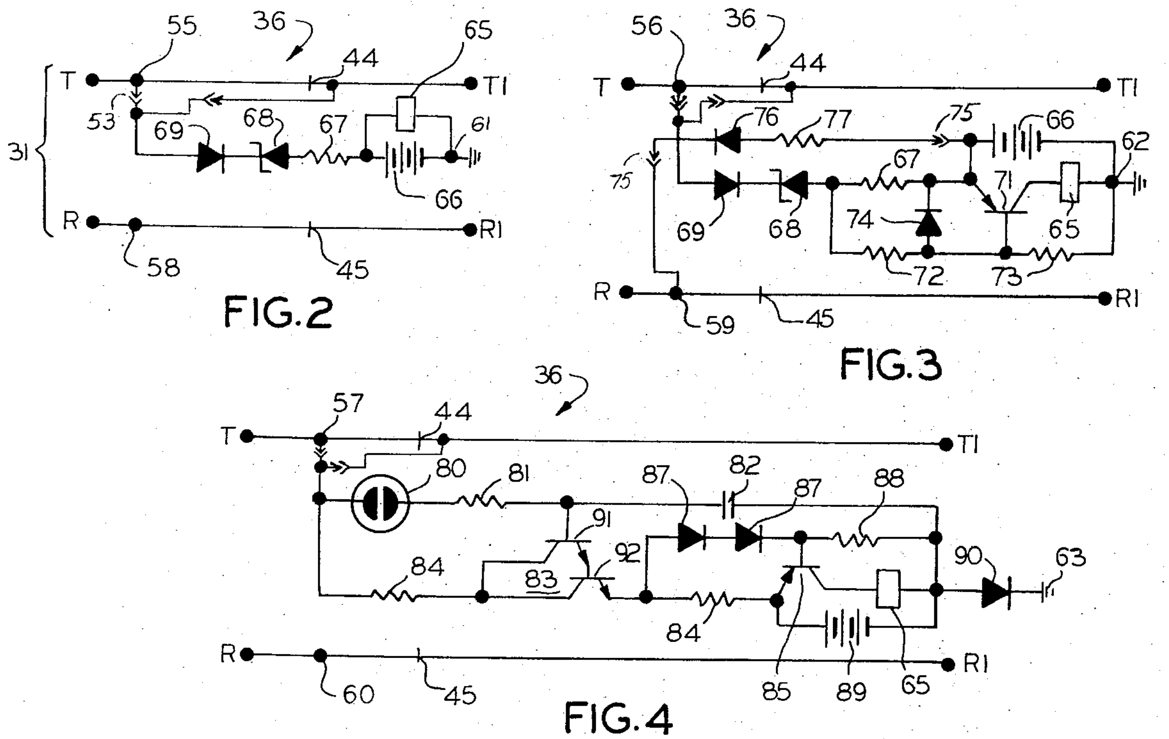

For a more complete understanding of a preferred embodiment of the invention, reference may be made to the attached drawing wherein:

FIG. 1 is a block diagram of a telephone system incorporating the invention, and FIGS. 2–4 are schematic circuit diagrams of three alternative embodiments of the invention.

FIG. 1 shows any suitable form of telephone system 20 having a plurality of lines 21, 22 connected thereto and a local test desk therein. Other cable or line pairs 23 are leased as metallic wires, with no connection to the central office. This figure has been drawn to indicate that a wide range of different forms of telephone equipment may have access to the office. For example, telephone stations A and B may be the usual calling and called lines. The teleprinters or teletypewriters 24, 25 may be leased from a telegraph company, a shared computer company, or the like, for example. Boxes 27, 28, 29 represent anything else which may conceivably be connected to a telephone line. Line 30 is a balanced line, and it is assumed that nothing may be connected to only one side thereof.

In the case of telephone stations A, B, the operating telephone company owning the central office 20 is responsible for all equipment connected to the lines. Nevertheless, any trouble on the lines may be isolated quickly and easily if the telephone instruments are disconnected so that the lines, per se, may be tested.

The lines 31, 32 are the property and responsibility of the operating company owning the central office 20. However, the teleprinters 24, 25 are the responsibility of the company leasing the line. Thus, the maintenance man responsible for giving service may be identified immediately if the teleprinter 24, 25 is disconnected from the lines 31, 32 prior to its being tested. Here, then, the question is one of determining which of two owners is responsible.

The lines 33, 34 are leased from the telephone company by a subscriber who connects his own equipment 27, 28 to the line. Here, again the question is whether the telephone company is responsible for the trouble. It is also assumed that the telephone company might want to remove the foreign attachment 27, 28 to release a switch train or otherwise disconnect the central office equipment 20.

In each case, an inventive quick disconnect device, such as 36 is connected between one side of the line and ground. The side used to operate device 36 is not really material. In the case of lines 21, 22, a separate quick disconnect device 37, 38 is shown as being connected to each side of the line, thereby enabling any two suitable control functions to be performed.

In the central office 20, a local test desk 40 is provided with means for testing the line and with a key 41 for connecting a booster battery 42 (or other potential source) to either side or to both sides of the line. Since most test desks already contain battery means for applying paystation coin control potentials to the line, this same means may also be used for applying battery to the line for controlling the inventive device.

In operation, a test man or other person at the test desk 40 consults any suitable chart or file and learns that the quick disconnect device 36 is connected to the ring side of the line 31. Then, he operates a key or keys to connect battery 42 to such ring side of line 31. The quick disconnect device 36 is also connected to any suitable local source of ground potential, much as paystations are so connected. Perhaps it is connected to a ground stake or a water pipe, for example.

Responsive to the application of the booster battery to the line, current flows over the line to charge a battery (preferably a nickel-cadmium battery) in device 36 as long as the key 41 is depressed. When the key 41 is released, the charged battery operates a local relay until the charge is exhausted. For this period, contacts 44, 45 are open so that the teleprinter 24 is disconnected from the line 31, which may then be tested, per se. It should be noted that this use of a locally charged battery eliminates the need for applying any operating potential to the line during the testing period. Therefore, the man at test desk 40 may disconnect all sources of potential from the line if he elects to do so.

If the line 30 is being tested, the battery 42 is connected across the line to charge a battery and thereby operate the device 46, with similar effect.

In the case of the leased line 23, one end is usually associated with a control point, such as a distribution frame, or the like. Also, for example, the station C could represent a home office of a shared computer, and the station D could represent a remote device on a computer customer's premises. In any event, a key 50 and battery source 51 are located at the appropriate point where line testing is controlled. The quick disconnect device 52 is located at the other end of the line which is remote from the testing station.

The inventive quick disconnect device 36 is here shown as being isolated from the central office 20 by the contacts 44, 45, which break the line during testing. This enables the central office to apply a testing potential to a line completely devoid of all attachments of every kind, including the quick disconnect device. However, FIGS. 2–4 may include optional wiring (shown by a symbol, as at 53) to enable the quick disconnect device to be placed on either side of the contacts 44, 45. This option may be desirable when and if a reverse potential may be applied to the line to quickly drive down the battery charge and thereby restore service in time of emergency. In the normally preferred embodiment, not even the quick disconnect device is connected to line 31 during testing from the central office.

The schematic circuits of three embodiments of the inventive quick disconnect device are shown in FIGS. 2–4. In each case, there is a quick disconnect device which may be connected in any one of the positions 36, 37, 38 or 46 of FIG. 1. The only difference between the tip and ring position 37, 38 is established by whether connections are made to the tip T at 55–57 as shown, or to the ring R at 58–60. On the ring side of the line, it may be desirable to reverse the polarity of the diodes. To place the quick disconnect device in the bridged position 46, the ground connections 61–63 are deleted and instead these points are connected to the ring side of the line at points 58–60, respectively.

In each embodiment, suitable nickel-cadmium batteries are used. For example, four Burgess CD1 or CD2 cells or Everready B 50 cells may be used. Other manufacturers also furnish similar cells. Also, in each embodiment there is the optional wiring, symbolized at 53, for connecting the quick disconnect device on either side of contacts 44, 45.

In the embodiment of FIG. 2, a series circuit, connected between the tip at 55 and ground 61, a threshold breakdown device in the form of Zener diode 68, and diode 69. The diode 69 is poled to isolate the battery 66 from the normal talking battery or other potential on either side of the line 31. The Zener diode 68 does not break down under normal line potential, but does break down when the potential of the charging battery 42 is connected to the tip side of the line. Resistor 67 provides current limiting.

When key 41 (FIG. 1) is closed, a charging current flows from battery 42, through contacts 41, over tip T, diode 69, Zener diode 68, resistor 67, and into the battery 66 to ground 61. When key 41 is opened, the charging current stops, and the battery 66 discharges into the winding of relay 65, thereby holding it operated until the battery charge is exhausted. The person at the test desk 40 controls the duration of key 41 operation, of the charging current, and therefor the duration of the relay 65 operation.

The embodiment of FIG. 3 shows a quick disconnect device which is controlled in part by an electronic switch 71. In greater detail, this embodiment includes a series circuit comprising the diode 69, Zener diode 68, current limiting resistor 67, battery 66, and relay 65, as described in connection with the embodiment of FIG. 2. In addition, there is an electronic switch here (in the form of a PNP transistor) for controlling the flow of current through the winding of relay 65. The emitter of this transistor 71 is connected to the current limiting resistor 67, and its collector is connected to the relay winding. The base bais is supplied to the transistor from a voltage divider 72, 73 connected between the booster battery 42 and ground 62 in parallel with current limiting resistor 67, transitor 71, and relay 65. A diode 74 is connected in parallel with the transistor 71 to protect it from transient spikes.

When the person at the test desk 40 closes key 41, current flows to charge the battery 66. However, the polarity is such that transistor 71 does not switch on, and no charging current may flow into the winding of the relay 65. When the key 41 is opened, the current from the now charged battery 66 causes a polarity relationship for turning on the transistor 71 and thereby energizing the winding of relay 65. Therefore, relay 65 operates as long as a charge remains in the battery. Here again, the normal duration of the relay operation depends entirely upon how great a charge is stored in the battery. This, in turn, is controlled by the length of time during which the test man at the desk 40 maintains key 41 in a closed condition.

However, if the test man should wish to arrange the circuit so that he may quickly restore the line to service, optional connections are made at 75, 75. Then, he is able to connect a booster battery of opposite polarity to the ring conductor R. The diode 76 conducts responsive to this battery, and current flows through resistor 77 to quickly discharge the local battery 66. Therefore, the relay 65 releases at once to restore the line to service.

The embodiment of FIG. 4 includes a series circuit comprising threshold breakdown device in the form of a neon bulb 80, a current limiting base bias resistor 81, and a capacitor 82 connected between the tip side of the line at 57 and ground 63. Resistor 81 and capacitor 82 together form a time constant circuit for controlling the responses of the quick disconnect device time. The capacitor 82 is also tuned to the frequency of voice signals and ringing current appearing on the line so that the quick disconnect circuit 36 is immune or transparent to both voice and ringing currents because they are conducted to ground. Resistor 81 also limits current and provides bias for the base of a pair 83 of transistors connected in a Darlington configuration.

A second series circuit is also connected between the tip 57 and ground 63. This circuit includes a current limiting resistor 84, the Darlington circuit 83, a second current limiting resistor 84, an electronic switch 85, and the relay winding 65. The Darlington circuit is used because it displays high impedance, low current, and provides a quick acting switch responsive to the appearance of charging current on the line. A pair of diodes 87 provide a circuit for supplying base bias to the base of the transistor 85. Two diodes are used to produce approximately a 1.2 volt drop between the emitter of the Darlington circuit transistor 92 and the base of the transistor 85. The local battery 89 is connected in parallel with the transistor 85 and relay 65. Diode 90 is connected between the quick disconnect circuit and ground, to isolate the circuit from imbalanced conditions and to prevent its possible response to power hum or other line noise.

If a potential of at least 90 volts D.C. is applied to the tip terminal T, the neon lamp 80 ionizes. After a time determined by the RC constants of resistor 81 and capacitor 82, a base current is supplied to transistor 91, which turns on. Base current is thus supplied to transistor 92 which also turns on. The battery 89 begins to charge at approximately 50 ma. The potential across resistor 87 turns off transistor 85 so that relay 65 does not operate. When the potential of the booster battery 42 is removed from the tip side T of the line, the transistor 85 turns on, energizing relay 65 which operates until the charge in local battery 89 drops and the resulting potential falls below the relay dropout voltage.

Previously described line disconnect devices have tended to rely on a charged capacitor to hold a relay operated. These devices have been limited to hold times set by the practical values of capacitance and relay coil resistance. The inventive device overcomes this limitation and allows the testman a more realistic time during which he may perform his tests. Also, the inventive remote disconnect device as herein disclosed may be located any place, not necessarily on the customer premises. An example of this would be at a point in the distribution of the outside plant cable. Accordingly, it is impervious to ringing, reverse battery and hook supervision, changes of battery potential, and all of the other normal line conditions, and circumstances which are attendant to the performance conventionally found in a telephone environment.

Various other modifications may be made without departing from the spirit or the scope of the invention. Therefore, the appended claims are to be construed broadly enough to cover all equivalent structures.

We claim:

1. A system for operating a remote disconnect device for opening a line at a distant location and thereby removing attachments therefrom, said line extending from a central office to equipment at said distant location, said system comprising means for transmitting a signal from the central office over said line to said distant location for a selected period of time, means local to the distant location for there disconnecting said line at a point between the said central office and all of the equipment at the distant location for a period of time which is dependent upon the duration of said signals on the line, and means whereby said disconnect means is operated during said disconnect period independently of all potentials on said line whereby said line may be tested free of all potentials and all equipment not directly involved in the testing.

2. The system of claim 1 wherein said line is a telephone line and said device is located on a subscriber's premises.

3. The system of claim 2 and battery means associated with said line and charged by current responsive to the signal transmitted over said line.

4. The system of claim 3 wherein the disconnecting means comprises switch means for disconnecting said line, said switch means being operated by the charged battery until it has exhausted its charge.

5. The system of claim 4 and means for draining said battery charge to quickly release said switch means and reconnect said line.

6. The system of claim 1 wherein said line extends from one customer premises to another customer premises without intervening switching, said signal transmitting means is associated with one of the premises and said disconnect means is associated with the other of said premises.

7. The system of claim 1 wherein said line is a telephone line, said disconnect means is connected between one side of said line and a local ground, and said signal transmitting means is means for applying a pay station coin control potential to said line.

8. The system of claim 1 wherein said disconnect means is a local battery and a relay associated with the distant location, means for connecting said battery to be charged by a booster battery potential on said line, said relay having contacts for disconnecting said line responsive to discharging current from said local battery.

9. The system of claim 8 wherein said relay is connected in parallel with said local battery and between one side of the line and a local ground.

10. The system of claim 9 wherein said local battery is a nickel-cadmium battery.

11. The system of claim 1 wherein said remote disconnect device also disconnects itself from said line during said period of time.

12. The system of claim 1 wherein said quick disconnect means comprises a series circuit connected between one side of the line and ground, said series circuit comprising at least a relay and battery in parallel, a voltage threshold breakdown device, and diode means poled to isolate the battery from the normal potentials on either side of the line, the breakdown device resisting break down under normal line potentials, but breaking down when the potential of the transmitted signal is applied to the one side of the line.

13. The system of claim 1 wherein said quick disconnect means comprises a circuit including a diode, a voltage breakdown device, a local battery, relay means having contacts for disconnecting said line, and electronic switch means for controlling the flow of current through a winding of said relay.

14. The system of claim 1 wherein said disconnect means comprises a series circuit including a voltage threshold breakdown device, time constant circuit means for controlling the response time of the disconnect means, means tuned to bypass the frequency of certain signals and appearing on the line so that the disconnect means is transparent to said certain signals, a second series circuit connected in parallel with the first series circuit, said second circuit including an electronic switch means, a local battery, and a relay winding, said local battery being connected in parallel with the electronic switch and relay, means responsive to operation of said switch for connecting said local battery to discharge through said relay winding, and contacts controlled by said relay to disconnect said line while said battery is discharging.

15. A method of freeing a line of all attachments and potentials associated with one end of said line, the method comprising the steps of:

a. transmitting a charging potential from the other end of said line to said one end of said line during a selected time period, said charging potential being transmitted over said line to a local battery at said one end, b. removing the charging potential from said line at the end of said time period, and c. using discharging current from said battery to disconnect all of said attachments including said battery from said line until said battery is exhausted, whereby after said disconnection said line is completely independent of potentials on said one end of said line during the disconnect period.

16. The method of claim 15 and means for testing the line during the period while the attachments are disconnected from the line.

17. The method of claim 15 which involves the use of a disconnect device to provide step c wherein step c includes the step of disconnecting said disconnect device from said line while said battery is being exhausted.

* * * * *